United States Patent
Kawashima et al.

(10) Patent No.: US 8,695,422 B2
(45) Date of Patent: Apr. 15, 2014

(54) VEHICULAR DISTANCE SENSOR APPARATUS

(75) Inventors: Yasuhiro Kawashima, Okazaki (JP); Tadao Shimizu, Tokai (JP); Naoki Osumi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/596,521

(22) Filed: Aug. 28, 2012

(65) Prior Publication Data

US 2013/0055809 A1  Mar. 7, 2013

(30) Foreign Application Priority Data

Sep. 6, 2011  (JP) ................................. 2011-193621

(51) Int. Cl.
*G01D 11/24* (2006.01)
*G01L 19/14* (2006.01)
*G01P 1/02* (2006.01)
*G12B 9/00* (2006.01)

(52) U.S. Cl.
USPC .......................................... 73/431; 248/27.1

(58) Field of Classification Search
USPC .......................................... 73/431; 248/27.1
See application file for complete search history.

(56) References Cited

U.S. PATENT DOCUMENTS

| | | | |
|---|---|---|---|
| 6,227,501 B1 | 5/2001 | Malcolm | |
| 7,398,687 B2 * | 7/2008 | Nakajima et al. | 73/661 |
| 7,428,187 B2 * | 9/2008 | Nakajima et al. | 367/140 |
| 7,522,474 B2 * | 4/2009 | Nakajima et al. | 367/140 |
| 8,411,532 B2 * | 4/2013 | Tsuzuki et al. | 367/188 |
| 2007/0220981 A1 * | 9/2007 | Nakajima et al. | 73/661 |
| 2007/0230273 A1 * | 10/2007 | Nakajima et al. | 367/140 |
| 2007/0230274 A1 * | 10/2007 | Nakajima et al. | 367/140 |
| 2011/0242941 A1 * | 10/2011 | Tsuzuki et al. | 367/118 |
| 2011/0242942 A1 * | 10/2011 | Tsuzuki et al. | 367/121 |

FOREIGN PATENT DOCUMENTS

| | | | |
|---|---|---|---|
| JP | 2009-229142 | | 10/2009 |
| JP | 2009229142 A | * | 10/2009 |
| JP | 2010-078519 | | 4/2010 |
| JP | 2010078519 A | * | 4/2010 |
| JP | 2011-053021 | | 3/2011 |
| JP | 2011053021 A | * | 3/2011 |

OTHER PUBLICATIONS

Office Action issued Dec. 4, 2013 in corresponding CN Application No. 2012 1032 8693.8 with English translation thereof.

* cited by examiner

*Primary Examiner* — Lisa Caputo
*Assistant Examiner* — Jamel Williams
(74) *Attorney, Agent, or Firm* — Harness, Dickey & Pierce, PLC

(57) ABSTRACT

A vehicular ultrasonic sensor apparatus serving as a distance sensor apparatus is equipped with a sensor unit, a case body, a bezel, and a retainer. The retainer includes a pair of pawl members. The pair of pawl members is equipped with a stopper portion. The ultrasonic sensor apparatus is inserted into an attachment hole of the bumper such that a connector portion of the case body is first inserted. When the retainer passes through the attachment hole, the pair of pawl members are elastically deformed. After passing through the attachment hole, the pair of pawl members are elastically restored, and the stopper portion is caught at an inner circumference edge of an exit side of the attachment hole.

14 Claims, 13 Drawing Sheets

FIG. 11A  THICKNESS-MIN
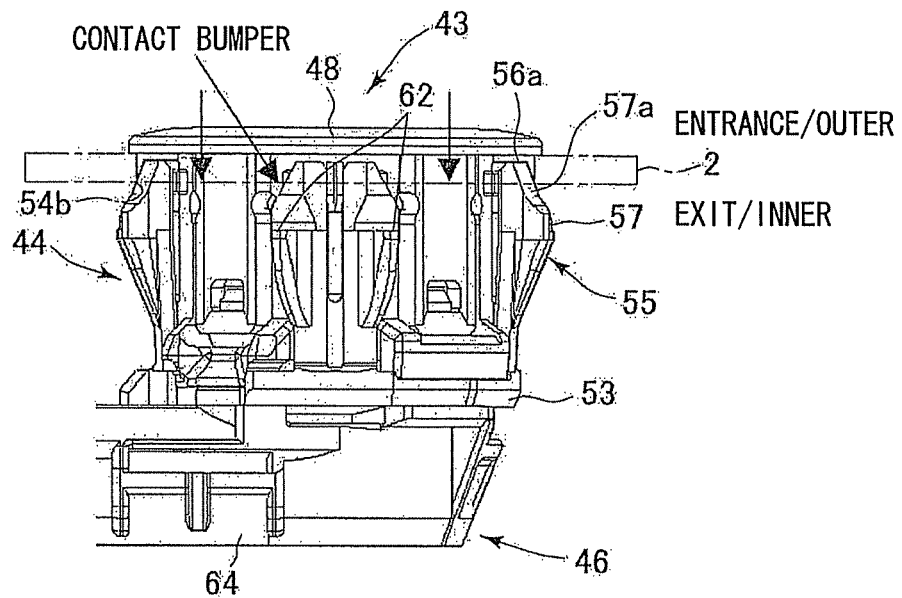
FIG. 11B
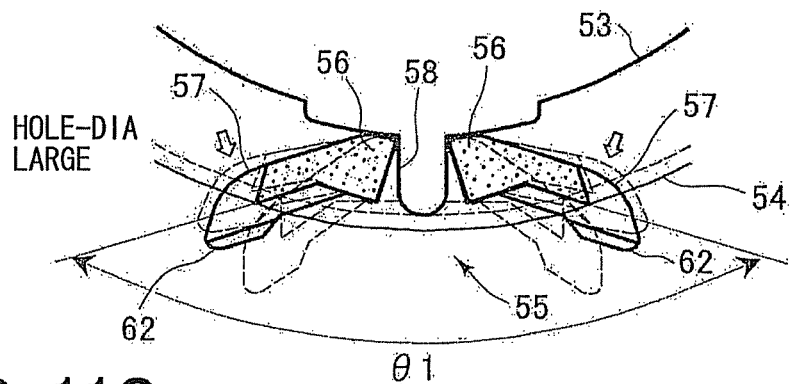
FIG. 11C
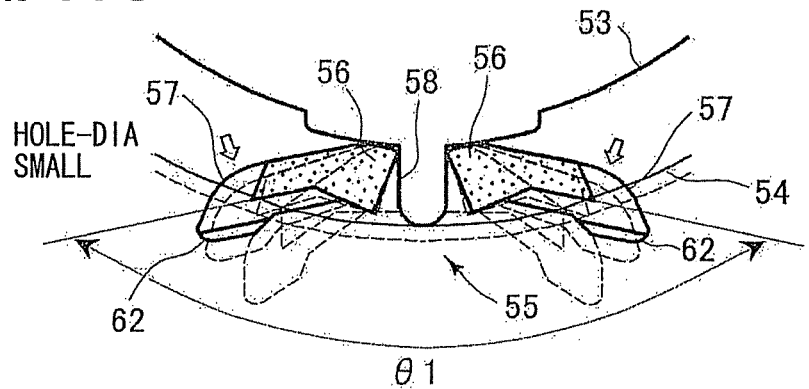

FIG. 12A THICKNESS-MAX
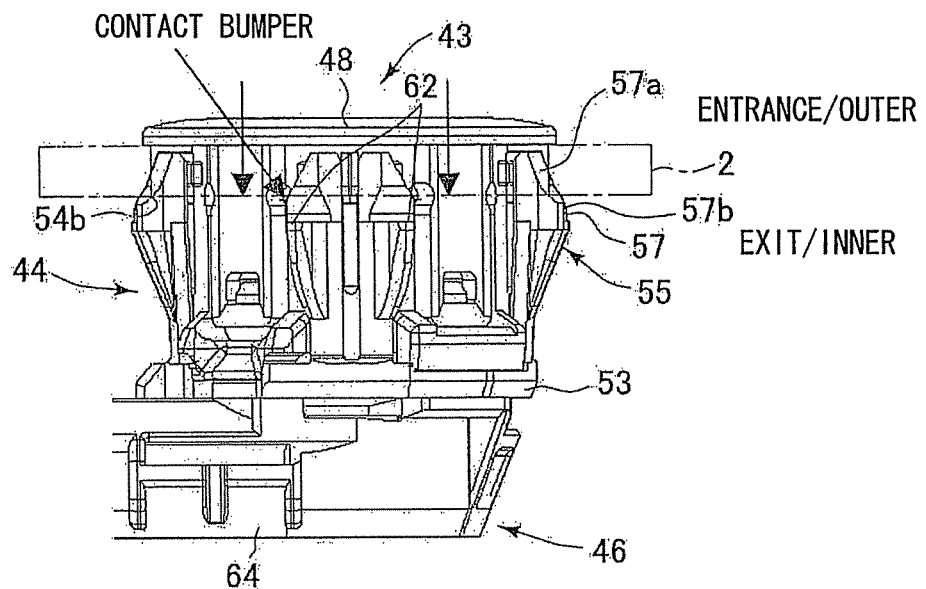
FIG. 12B
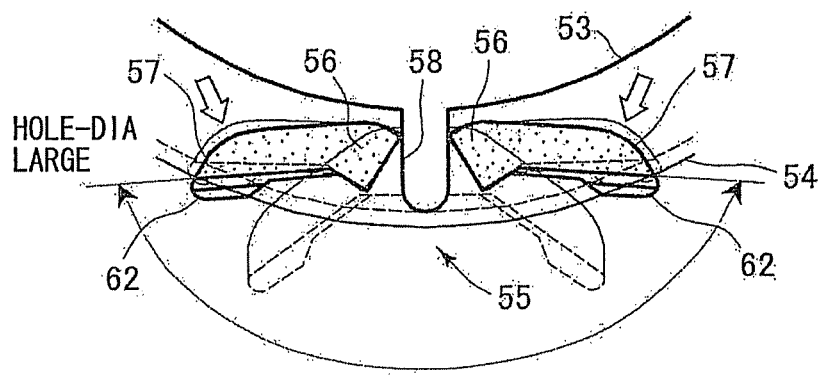
FIG. 12C
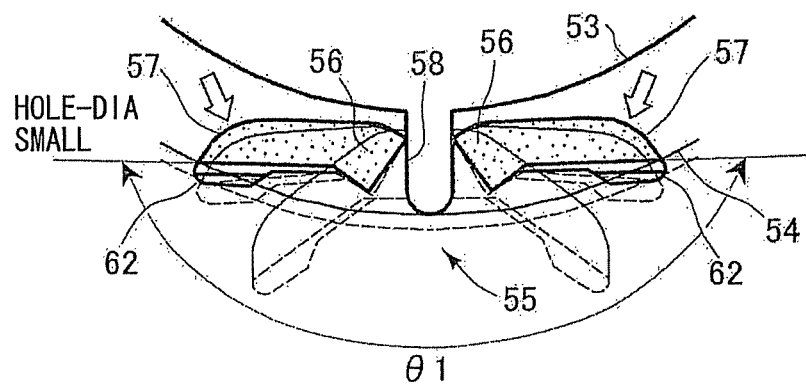

VEHICULAR DISTANCE SENSOR APPARATUS

CROSS REFERENCE TO RELATED APPLICATION

This application is based on Japanese Patent Application No. 2011-193621 filed on Sep. 6, 2011, the disclosure of which is incorporated herein by reference.

TECHNICAL FIELD

The present disclosure relates to a vehicular distance sensor apparatus that may be used for an in-vehicle obstacle detector.

BACKGROUND

[Patent document 1] JP 2000-513296 A (U.S. Pat. No. 6,227,501 B1)

An ultrasonic sensor apparatus will be explained which measures a distance from a vehicle to an obstacle using ultrasonic waves as an example of a distance sensor apparatus. A recent vehicle may be equipped with a clearance sonar that is an obstacle detector to assist a driving manipulation at parking, for example. The clearance sonar includes the predetermined number of ultrasonic sensor apparatuses, e.g., two of which are disposed in the front bumper and four of which are disposed in the rear bumper. The clearance sonar detects a time duration until when ultrasonic waves transmitted from the ultrasonic sensors hit an obstacle and return, thereby measuring a distance from the vehicle to the obstacle. When the distance becomes smaller than a setup value, a driver may be notified via a sound. The above ultrasonic sensor apparatus is described in Patent document 1.

As illustrated in FIG. 13, an ultrasonic sensor apparatus 3' is divided into two parts of a bezel 43' and a case body 46' when attaching to an attachment hole 54 of a bumper 2; after placing oppositely the two parts on the outside and the inside of the bumper 2, the two parts are brought close to each other and attached to the bumper as one assembly.

In a conventional ultrasonic sensor apparatus 3', several metal springs 55' are attached to the bezel 43' that supports a sensor unit 42'; the metal springs 55' are engaged at circumference edge portions of the attachment hole 54 in the bumper 2, achieving the fixation of the ultrasonic sensor apparatus 3'. The metal springs 55' are manufactured independently from the bezel 43', for example, by using a multi-forming die, and are thereafter attached with the bezel 43' to be one assembly. Therefore, the process is needed for attaching the metal springs 55' to the bezel 43', increasing costs of the ultrasonic sensor apparatus 3'.

Further, the conventional ultrasonic sensor apparatus 3' uses an attachment operation having two actions of the first action for attaching previously the bezel 43' to the bumper 2, and the second action for attaching the case body 46'. Another attachment operation may be considered which attaches first the bezel 43' and the case body 46', and inserts them to the attachment hole 54 of the bumper 2. In such an attachment operation, when passing through the attachment hole 54, the metal springs 55' are plastically deformed to be crushed. This may cause a possibility not to sandwich the bumper 2. Further, it is also difficult to respond to bumpers 2 having different thicknesses, respectively.

SUMMARY

It is an object of the present disclosure to provide a vehicular distance sensor apparatus that is easily attached to a bumper of a vehicle and held fixedly.

To achieve the above object, according to a first aspect of the present disclosure, a vehicular distance sensor apparatus is provided as follows. The apparatus is to be attached to an attachment hole of a bumper of a vehicle to measure a distance from the vehicle to an obstacle. The vehicular distance sensor apparatus includes a sensor unit, a case body, a bezel, a retainer. The sensor unit transmits a transmission signal outward from the vehicle. The transmission signal hits the obstacle and returns as a reflection signal. The sensor unit receives the reflection signal. The case body holds the sensor unit, and is to be attached to the attachment hole of the bumper of the vehicle. The bezel has (i) a pipe portion fitted to the case body and (ii) a flange portion at one end portion in an axial direction of the pipe portion. The flange portion has an outer diameter larger than a hole diameter of the attachment hole. The retainer is made of resin material and is fitted to the pipe portion of the bezel. The retainer comprises a basal portion, a plurality of arm portions, a plurality of pawl portions, and a stopper portion. The basal portion is shaped of a ring. The plurality of arm portions are extending in an axial direction from one end face of the basal portion. The plurality of pawl portions that are protrusions protruding from tip ends of the plurality of arm portions in a direction intersecting the axial direction. The protrusions have ridge top portions through which a virtual circle is defined to pass. The virtual circle has a diameter larger than the hole diameter of the attachment hole. The plurality of pawl portions are elastically deformed (i.e., undergo elastic deformation) when the plurality of pawl portions are inserted into the attachment hole. The plurality of pawl portions are elastically restored (i.e., undergo elastic restoration) to be engaged with an inner circumference edge of an exit side of the attachment hole in a state where the ridge top portions have passed through the attachment hole. The stopper portion is provided to be caught by the inner circumference edge of the exit side of the attachment hole when the plurality of pawl portions are elastically restored in the state where the ridge top portions have passed through the attachment hole.

The above vehicular distance sensor apparatus includes a sensor unit, a case body, a bezel, and a retainer. When the apparatus is attached to the attachment hole of the bumper, an insertion process into the attachment hole is performed in an insertion order from the case body to other parts. During the insertion process, the retainer is inserted such that the pawl portions are being elastically deformed by the inner circumference edge of the attachment hole. Then, in an attachment state where the apparatus is attached to the attachment hole of the bumper, the pawl portions are elastically restored, and the stopper portion is caught by the inner circumference edge of the exit side of the attachment hole. Thereby, the distance sensor apparatus may be prevented from dropping out. In particular, the stopper portion is provided in the distance sensor apparatus of the above configuration according to the aspect of the present disclosure. Therefore, the dropout of the apparatus is more certainly prevented as compared with a conventional distance sensor apparatus not having a stopper portion. Further, in order to connect an in-vehicle wire harness to the sensor unit, a force may act in the direction in which the distance sensor apparatus is escaped from the attachment hole. Even in such a case, the above configuration may reduce a possibility that the distance sensor apparatus drops out or deviates.

According to a second aspect of the present disclosure, a vehicular distance sensor apparatus is provided as follows. The apparatus is attached to an attachment hole of a vehicle to measure a distance from the vehicle to an obstacle. The vehicular distance sensor apparatus includes a sensor unit, a case body, a bezel, and a retainer. The sensor unit transmits a transmission signal outward from the vehicle. The transmission signal hits the obstacle and returns as a reflection signal. The sensor unit receives the reflection signal. The case body holds the sensor unit, and is to be attached to the attachment hole of the bumper of the vehicle. The bezel has (i) a pipe portion fitted to the case body and (ii) a flange portion at one end portion in an axial direction of the pipe portion. The flange portion has an outer diameter larger than a hole diameter of the attachment hole. The retainer is made of resin material. The retainer includes a basal portion, a plurality of arm portions, and a plurality of pawl portions. The basal portion is shaped of a ring, and fitted to the pipe portion of the basal portion. The plurality of arm portions are extending from one end face of the basal portion in the axial direction of the ring of the basal portion. The plurality of pawl portions are protrusions protruding from tip ends of the plurality of arm portions in a direction intersecting the axial direction. The plurality of pawl portions include ridge top portions through which a circle passes. The circle has a diameter larger than the hole diameter of the attachment hole. The plurality of pawl portions undergoing elastic deformation when being inserted into the attachment hole. The plurality of pawl portions undergo elastic restoration after the ridge top portions pass through the attachment hole to be engaged with an inner circumference edge of an exit side of the attachment hole. Herein, a space gap is provided to be formed in between an inner circumference face of the arm portion of the retainer and an outer circumference face of the pipe portion of the bezel in a state where the basal portion of the retainer is fitted to the pipe portion of the bezel.

BRIEF DESCRIPTION OF THE DRAWINGS

The above and other objects, features, and advantages of the present disclosure will become more apparent from the following detailed description made with reference to the accompanying drawings. In the drawings:

FIG. 11A is a schematic perspective view illustrating an attachment state where the ultrasonic sensor apparatus is attached in a bumper having a small board thickness;

FIG. 11B is a plan view when a hole diameter of an attachment hole of a bumper is large in FIG. 11A;

FIG. 11C is a plan view when a hole diameter of an attachment hole of a bumper is small in FIG. 11A;

FIG. 12A is a schematic perspective view illustrating an attachment state where the ultrasonic sensor apparatus is attached to a bumper having a large board thickness;

FIG. 12B is a plan view when a hole diameter of an attachment hole of a bumper is large in FIG. 12A;

FIG. 12C is a plan view when a hole diameter of an attachment hole of a bumper is small in FIG. 12A.

DETAILED DESCRIPTION

The following describes an embodiment of the present disclosure.

Figure 1:
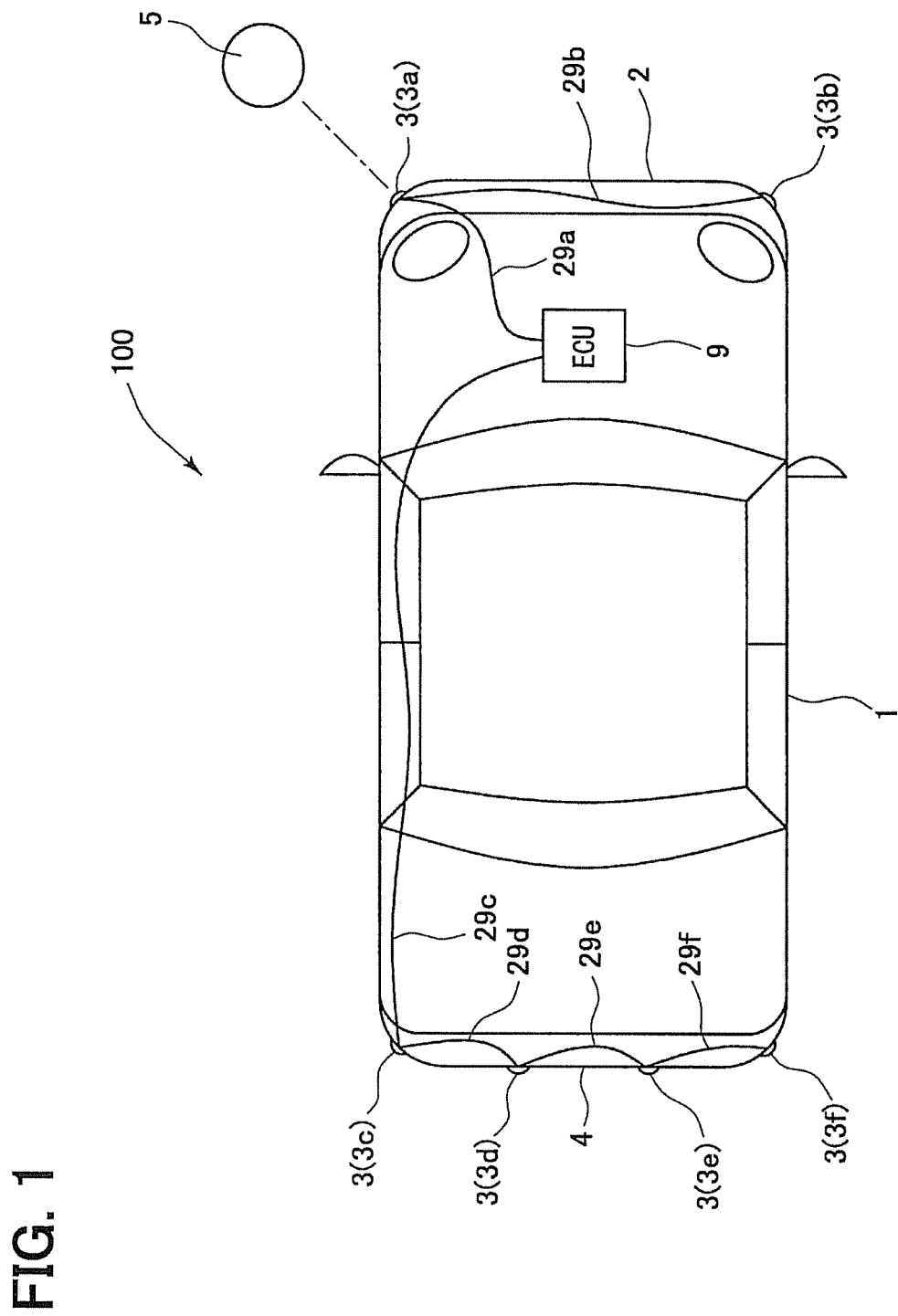
FIG. 1 is a plan view of a vehicle having an ultrasonic sensor apparatus according to an embodiment of the present disclosure.

FIG. 1 is a plan view of a vehicle 1 having ultrasonic sensor apparatuses 3 according to an embodiment of the present disclosure. The vehicle 1 has an obstacle detector 100 (clearance sonar) that includes ultrasonic sensor apparatuses 3 (3a, 3b) attached to right and left corner portions in a front bumper 2, and ultrasonic sensor apparatuses 3 (3c, 3d, 3e, 3f) attached to right and left corner portions and central portions in a rear bumper 4. Each ultrasonic sensor apparatus 3 transmits an ultrasonic wave outward from the vehicle 1 under a predetermined condition. The transmitted ultrasonic wave hits an obstacle 5 and is reflected as a reflected ultrasonic wave. Upon receiving the reflected ultrasonic wave, the ultrasonic sensor apparatus 3 detects a distance from the vehicle 1 to the obstacle 5, notifying a driver of the vehicle 1 of the detected distance via a sound based on the distance.

Figure 2:
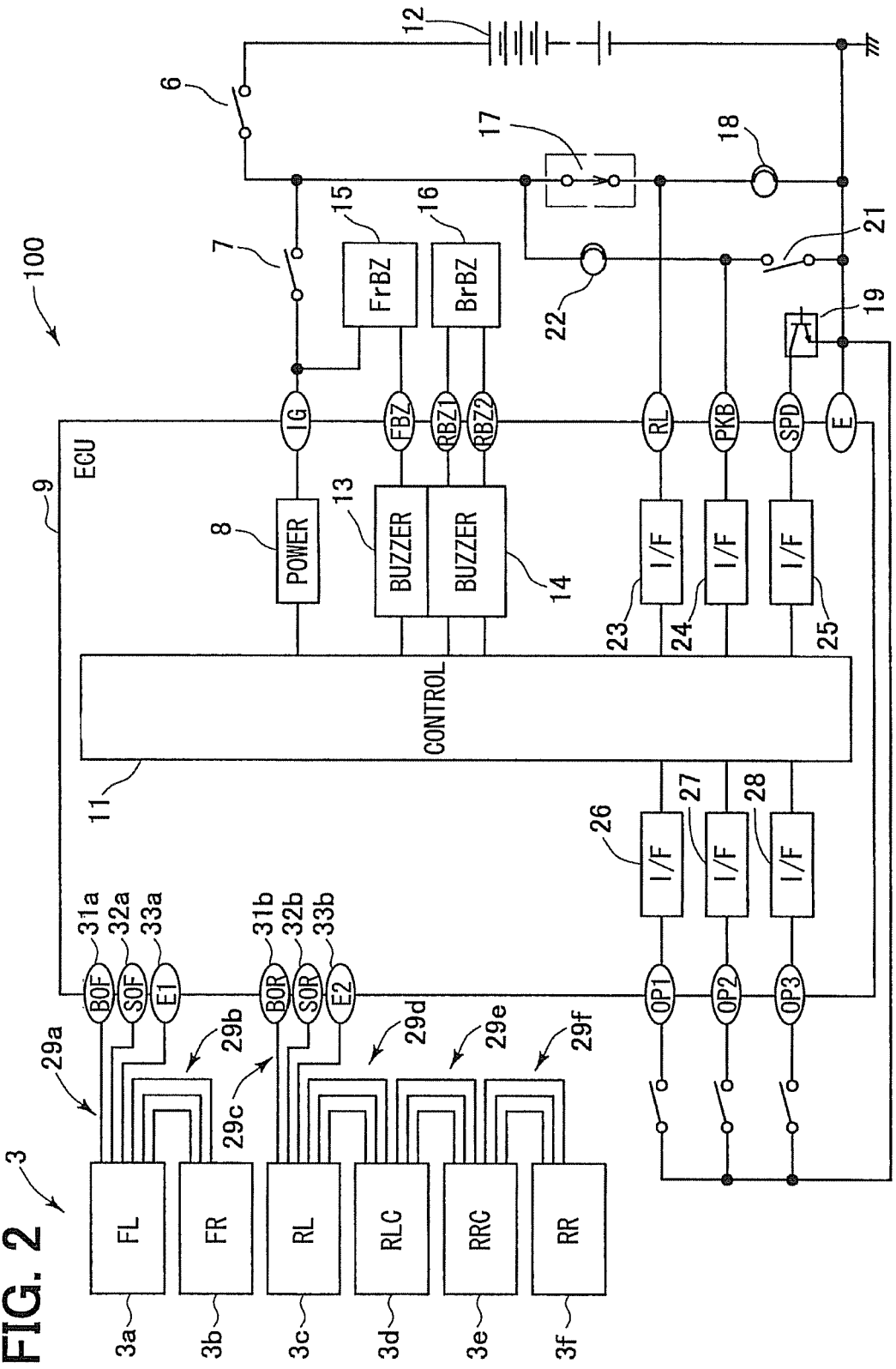
FIG. 2 is a block diagram illustrating a configuration of an obstacle detector.

With reference to FIG. 2, a system block of the obstacle detector 100 will be explained. The driver turns on an ignition switch 6 in a state where a main switch 7 of the obstacle detector 100 is set to the ON state. A control circuit 11 of an ECU (electronic control unit) 9 is thereby supplied with an electric power from a battery 12. This power supply causes buzzers 15, 16 to be in an operation standby state via a buzzer driving circuits 13, 14. The buzzer 15 is associated with each ultrasonic sensor apparatus 3 (3a, 3b) attached to the front bumper 2; the buzzer 16 is associated with each ultrasonic sensor apparatus 3 (3c, 3d, 3e, 3f) attached to the rear bumper 4. Then the driver puts the shift position of the vehicle 1 into positions other than the parking position (P). The start, switch 17 is thereby turned into the ON state, starting an operation of the obstacle detector 100. It is noted that a back up lamp 18 is used for changing an operating condition to operate each ultrasonic sensor apparatus 3 (3d, 3e) on the rear bumper 4 when the driver puts the shift position into the reverse position (R). In addition, each ultrasonic sensor apparatus 3 (3a, 3b, 3c, 3f) attached to the left and right corner portions is operated only when a vehicle speed is less than a predetermined value (for example, 10 km/h); thus, a vehicle speed sensor 19 is provided to detect the vehicle speed. In addition, the obstacle detector 100 is not operated while the parking brake operates; thus, a parking brake switch 21 detects the operation condition. A parking brake lamp 22 is turned on while the parking brake operates, thereby, notifying the driver. These apparatuses are connected to the control circuit 11 via each interface circuit 23 to 25. In addition, optional apparatuses related with the obstacle detector 100 are connected to the control circuit 11 via each interface circuit 26 to 28.

As illustrated in FIG. 1 and FIG. 2, each ultrasonic sensor apparatus 3 (3a to 3f) is connected to the ECU 9. Out of the two ultrasonic sensor apparatuses 3a, 3b attached to the front bumper 2, the ultrasonic sensor apparatus 3a attached to the left (passenger seat side) corner portion of the front bumper 2 is connected to a GND terminal 31a , a front serial communication terminal 32a, and a power supply terminal 33a of the ECU 9 via a wire harness 29a. In addition, the ultrasonic sensor apparatus 3b attached to the right (driver seat side) corner portion of the front bumper 2 is connected to the ultrasonic sensor apparatus 3a in series via the wire harness 29b. Similarly, the ultrasonic sensor apparatus 3c attached to the left (passenger seat side) corner portion of the rear bumper 4 is connected to a GND terminal 31b, a rear serial communication terminal 32b, and a power supply terminal 33b of the ECU 9 via a wire harness 29c. In addition, the ultrasonic sensor apparatuses 3d, 3e, 3f attached to the central portions and the right (driver seat side) corner portion of the rear bumper 4 are connected to the ultrasonic sensor apparatus 3c in series via wire harnesses 29d, 29e, 29f.

Figure 3:
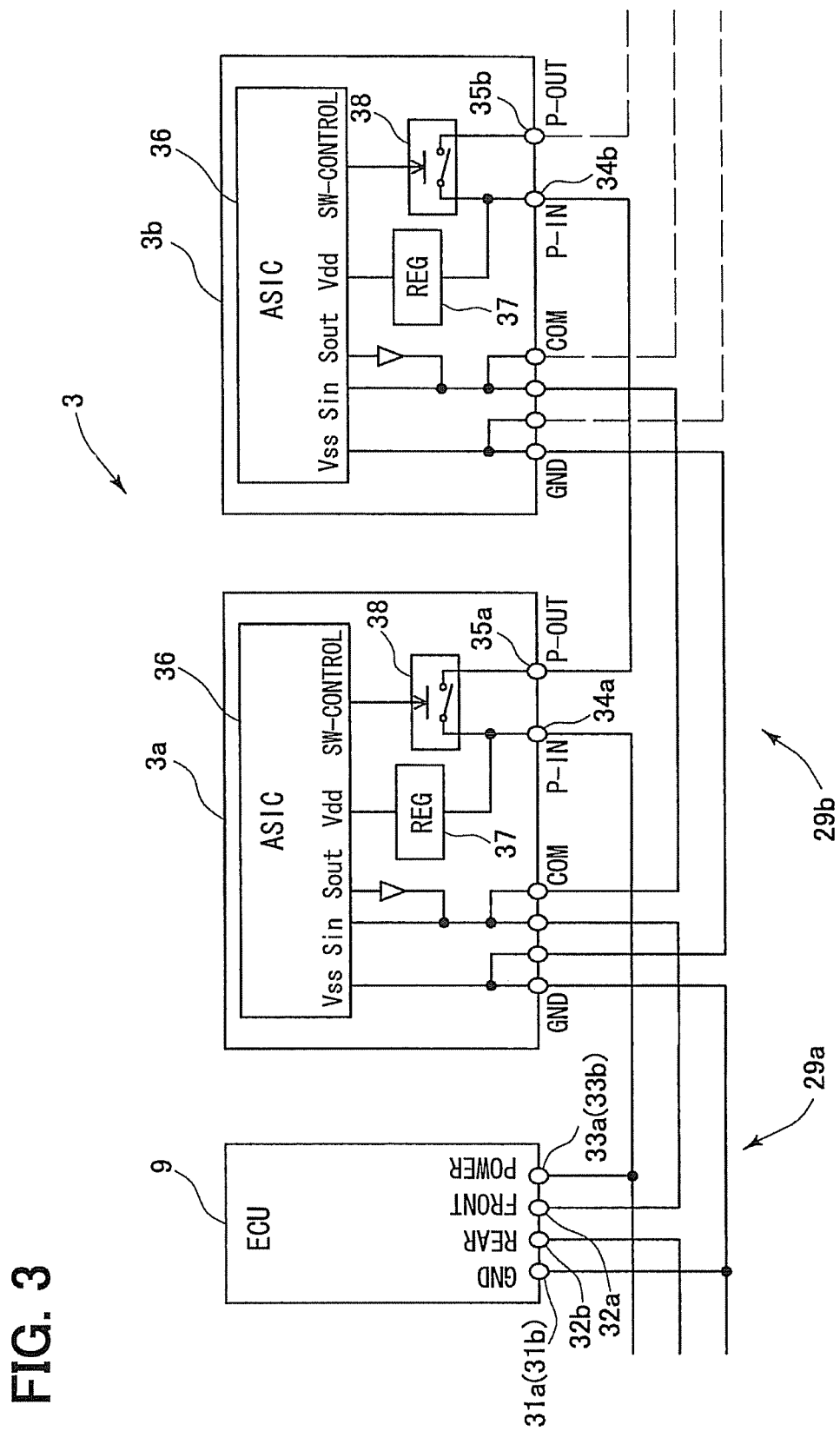
FIG. 3 is a diagram illustrating a main part of FIG. 2.

The topology of the ultrasonic sensor apparatuses 3a, 3b attached to the front bumper 2 will be explained. With reference to FIG. 3, each ultrasonic sensor apparatus 3a, 3b has a power source input terminal 34a, 34b, and a power source output terminal 35a, 35b. The power supply terminal 33a of the ECU 9 is connected with the power source input terminal 34a of the ultrasonic sensor apparatus 3a; the power source output terminal 35a of the ultrasonic sensor apparatus 3a is connected with the power source input terminal 34b of the ultrasonic sensor apparatus 3b (daisy chain connection). The power source of each ultrasonic sensor apparatus 3a, 3b includes a regulator 37 and a field effect transistor (FET) 38. The regulator 37 is in between the power supply terminal (Vdd) of an ASIC (Application Specific Integrated Circuit) 36, and the power source input terminal 34a. The FET 38 is in between (i) a switch control terminal of the ASIC 36, and (ii) the power source input terminal 34a, and the power source output terminal 35a. That is, the feeding power to each ultrasonic sensor apparatus 3a, 3b is switched by an switching operation of the FET 38.

When another ultrasonic sensor apparatus 3 is connected to the ultrasonic sensor apparatus 3b, it is connected similarly to the above. This connection state is illustrated in a broken line in FIG. 3. It is noted that the four ultrasonic sensor apparatuses 3c to 3f attached to the rear bumper 4 are connected in the same manner as that of the ultrasonic sensor apparatuses 3a, 3b; thus, the explanation is omitted. In addition, the front side ultrasonic sensor apparatuses 3a and 3b and the rear side ultrasonic sensor apparatuses 3c to 3f have individually exact the same configuration; thus, explanation will be made collectively for one ultrasonic sensor apparatus 3 hereinafter.

Figure 4:
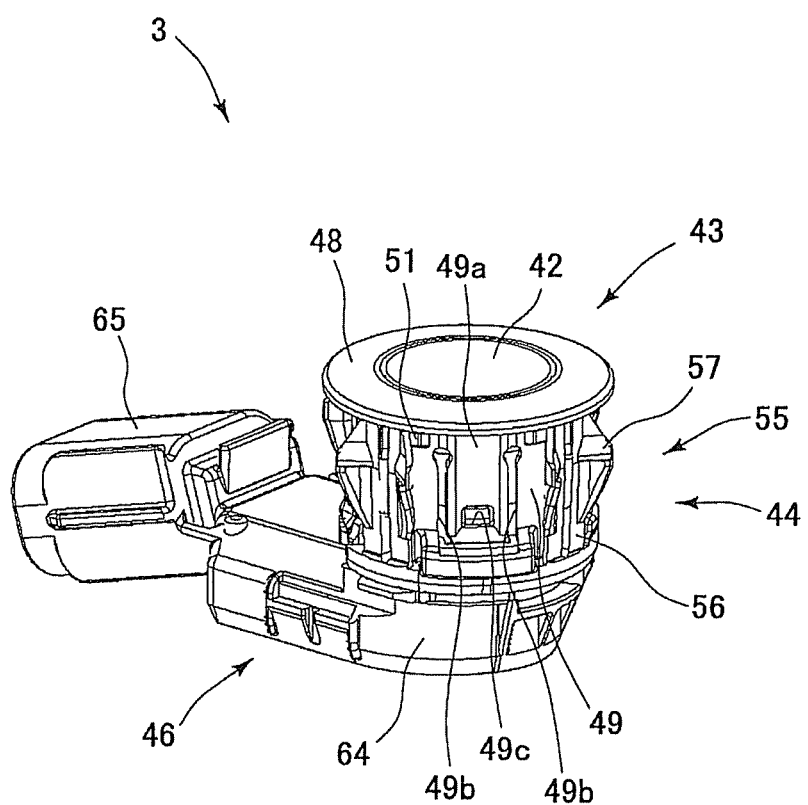
FIG. 4 is a perspective view of the ultrasonic sensor apparatus.
Figure 5:
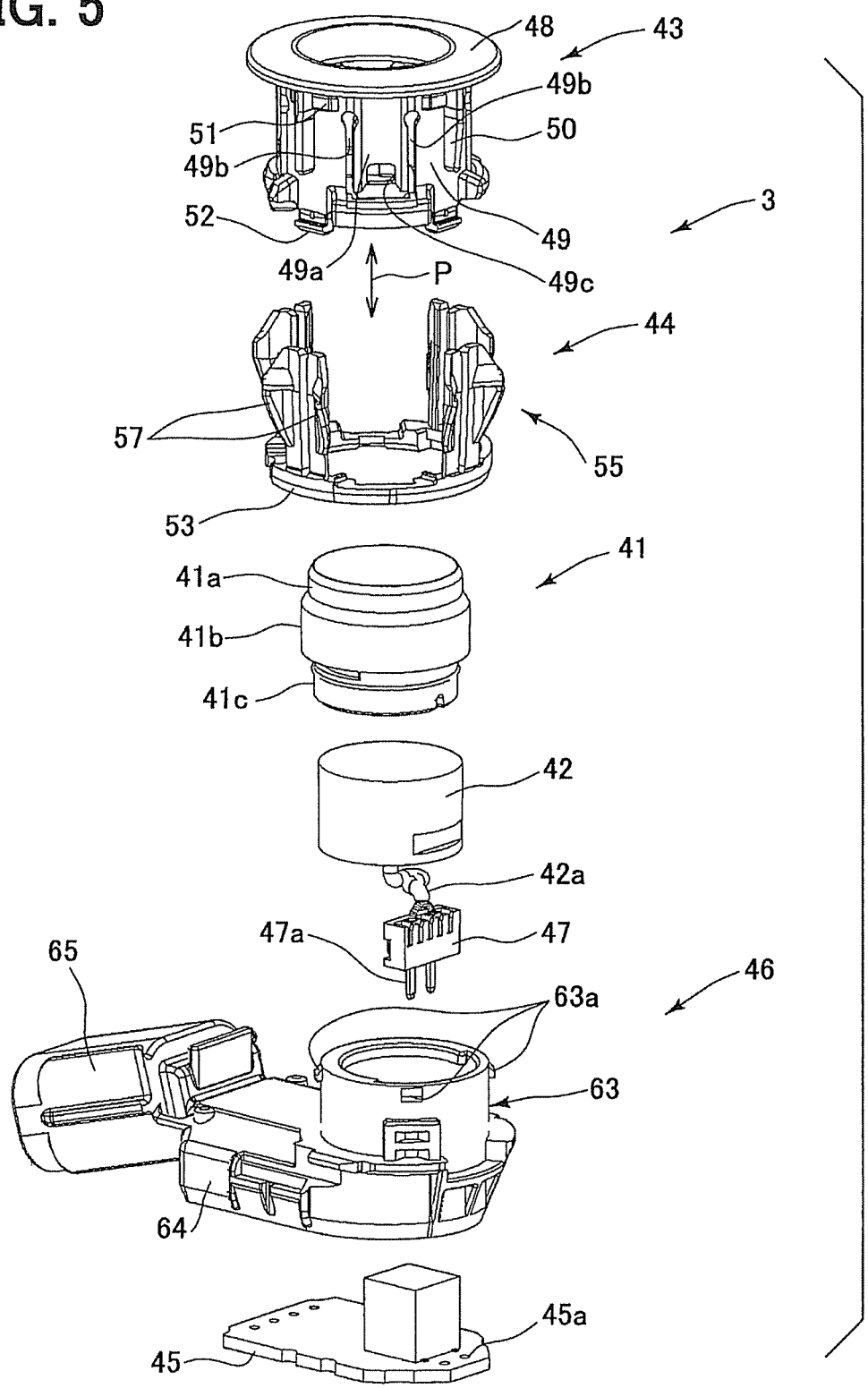
FIG. 5 is an exploded perspective view of the ultra sonic sensor apparatus.

The configuration of the ultrasonic sensor apparatus 3 of the present embodiment will be explained. With reference to FIGS. 4, 5, the ultrasonic sensor apparatus 3 includes the following. A sensor unit 42 (microphone) is shaped of a cylinder. The sensor unit 42 transmits an ultrasonic wave (i.e., transmission signal) outward from the vehicle 1, which hits an obstacle 5 and returns as a reflected ultrasonic wave (i.e., reflection signal), and receives the reflected ultrasonic wave. A cushioning material 41 is made of silicone rubber or the like and covers the sensor unit 42. A case body 46 supports the cushioning material 41 and the sensor unit 42. A bezel 43 covers the case body 46. A retainer 44 is attached to the bezel 43. A board member 45 is an electronic circuit portion, which is connected with the sensor unit 42 and controls the sensor unit 42.

Each member or component will be explained further with reference to FIGS. 4, 5. The cushioning material 41 is shaped of a hollow cylinder with steps to include a first and second cylinder portions 41a, 41c which are disposed at both end portions, respectively, and have almost the same outer diameter, and a third cylinder portion 41b which is in between the first and second cylinder portions 41a, 41c and has an outer diameter slightly larger than that of the first and third cylinder portions 41a, 41c. The first, second, and third cylinder portions 41a, 42b, 42c are integrated into one assembly or unit.

The sensor unit 42 contains a piezoelectric element (unshown) which has a predetermined character frequency. The board member 45 is operated to apply a predetermined voltage to the piezoelectric element; thereby, the piezoelectric element vibrates to generate an ultrasonic wave. The ultrasonic wave is transmitted outward from a top face of the sensor unit 42. The sensor unit 42 receives an ultrasonic wave, which hits an obstacle 5 and is reflected. At this time, the time period for the ultrasonic wave to undergo a round trip from the sensor unit 42 to the obstacle 5 is measured; thereby, the distance from the vehicle 1 to the obstacle 5 is obtained.

An electric wire 42a is extended from a bottom face of the sensor unit 42; the sensor unit 42 is connected with the board member 45 via the electric wire 42a. That is, two terminals 47a are protruded from the connector 47 provided at a tip end of the electric wire 42a, and the two terminals 47a are inserted in corresponding insertion holes 45a of the board member 45. The sensor unit 42 is thus connected with the board member 45.

The following will explain the bezel 43. The bezel 43 includes (i) a thin flange portion 48 shaped of a ring and (ii) a pipe wall portion 49 shaped of a pipe. The inner diameter of the pipe wall portion 49 is slightly larger than an outer diameter of a sensor acceptance portion 63 in the case body 46. The sensor unit 42 is covered by the cushioning material 41. The first and third cylinder portions 41a, 41b of the cushioning material 41 are inserted inside of the bezel 43; the second cylinder portion 41c is inserted inside of the sensor acceptance portion 63 of the case body 46. Therefore, the inner diameter of the flange portion 48 is slightly larger than the outer diameter of the first cylinder portion 41a of the cushioning material 41. The inner diameter of the pipe wall portion 49 is slightly larger than the outer diameter of the third cylinder portion 41b of the cushioning material 41. The sensor unit 42 covered by the cushioning material 41 is accommodated in the pipe wall portion 49 such that the top face of the sensor unit 42 and the top face of the flange portion 48 of the bezel 43 form a flat plane without any step.

The pipe wall portion 49 of the bezel 43 is provided with a plurality of ribs 50 on the outer circumference face (e.g., four ribs in the present embodiment); the four ribs 50 are arranged with fixed angle intervals along a circumference of the pipe wall portion 49. Each rib 50 is extended downward in the axial direction (this direction is hereinafter indicated as the axial direction P) of the bezel 43 from the bottom face of the flange portion 48; a bottom end portion of the each rib 50 is located at a position corresponding to the half of the height of the pipe wall portion 49 (I.e., the length of the pipe wall portion 49 in the axial direction P). The ribs 50 reinforce the rigidity of the bezel 43 while having a function of preventing the retainer 44 fitted to the bezel 43 from shifting along the circumference.

Further, an approximately rectangular protruding portion 51 is disposed in the pipe wall portion 49 to be adjacent on a side of each rib 50 just below the flange portion 48. The function of the rectangular protruding portions 51 will be mentioned later.

Further, the pipe wall portion 49 of the bezel 43 is provided with a plurality of locking claws 52 in the bottom end portion (e.g., four locking claws 52 in the present embodiment); the four locking claws 52 are arranged with fixed angle intervals along a circumference of the pipe wall portion 49. In the case of the bezel 43 of the present embodiment, each locking claw 52 is placed directly below each rib 50. The locking claws 52 are caught in the basal portion 53 of the retainer 44 when the retainer 44 is fitted to the bezel 43. At this time, a top end face of the pawl portion 55 of the retainer 44 abuts a bottom face of the flange portion 48. The top end face of the pawl portion 55 is a tip end portion 56a of the arm portion 56. Thereby, the retainer 44 fitting to the bezel 43 is bound in an up and down direction (i.e., axial direction P), and does not shift in the up and down direction.

Further, the pipe wall portion 49 of the bezel 43 is provided with a plurality of movable wall portions 49a along the circumference (e.g., four movable wall portions 49a in the present embodiment); the four movable wall portions 49a are arranged with fixed angle intervals along a circumference of the pipe wall portion 49. Each movable wall portion 49a is elastically deformable outward in a radial direction independently while having a base end portion as a supporting point. The pipe wall portion 49 is provided with several pairs of slits 49b, 49b; the slit 49b is extended in the axial direction P from a top end portion to a bottom end portion while the slit 49b is open at the bottom end portion. The movable wall portion 49a is defined as the portion of the pipe wall portion 49 in between the pair of slits 49b, 49b. Each movable wall portion 49a is provided with a tab hole portion 49c which is engaged with a protruding portion 63a of the case body 46. The protruding portion 63a is disposed close to an opening portion of the sensor acceptance portion 63 of the case body 46.

The following will explain the retainer 44. The retainer 44 includes a basal portion 53 and several pawl portion 55 (four in the present embodiment). The basal portion 53 is shaped of a ring and has an inner diameter slightly larger than an outer diameter of the pipe wall portion 49 of the bezel 43. Each of the four pawl portions 55 is extended upward in the axial direction P of the retainer 44 from a top face of the basal portion 53 and caught by an attachment hole 54 of the bumper 2, 4. Each of the pawl portions 55 has an identical shape. The pawl portion 55 includes an arm portion 56 and a pair of pawl members 57. The arm portion 56 is extended in the axial direction P of the retainer 44 from a top face of the basal portion 53. The pair of pawl members 57 are arranged to protrude from the end portion in the width direction in the outer side face of the arm portion 56 in a direction intersecting the axial direction P of the retainer 44 and slanting to the outer side face of each arm portion 56. The pair of pawl members 57 are symmetrically arranged to provide a V shape in a plan view (axial directional view). The arm portion 56 has a slit 58 in an approximately central portion in the width direction (along the circumferential direction); the slit 58 is extended in the axial direction P of the retainer 44 so as to have an opening at the tip end portion 56a of the arm portion 56 and reach the top face of the basal portion 53. Therefore, each pawl member 57 is elastically deformable independently. The opening angle θ1 (refer to FIG. 6A) in between the pair of pawl members 57 is desirably between 105 and 115 degrees.

That is, each pawl member 57 is shaped of an approximately triangle in a front view of the pawl member 57 (in a side view of the retainer 44). The pawl member 57 includes a first ridge line portion 57a, a ridge top portion 57b, and a second ridge line portion 57c. The first ridge line portion 57a rises aslant from the tip end portion 56a of the arm portion 56 in a direction separating from the axial direction P of the retainer 44 to reach the ridge top portion 57b as a terminal end portion. The second ridge line portion 57c goes down with a gentle angle of gradient from the ridge top portion 57b of the pawl member 57 to the front face (outer side face) of the arm portion 56. Further, refer to FIGS. 6B, 6C. In a side view of the pawl portion 55, an angle θ2 is formed in between an inner side face of the arm portion 56 and the first ridge line portion 57a of the pawl member 57; the angle θ2 is 20 to 25 degrees, for example. In a front view of the pawl portion 55, an angle θ3 is formed in between a vertical line of the slit 58 of the arm portion 56 and the first ridge line portion 57a of the pawl member 57; the angle θ3 is 25 to 30 degrees, for example.

Figure 6A:
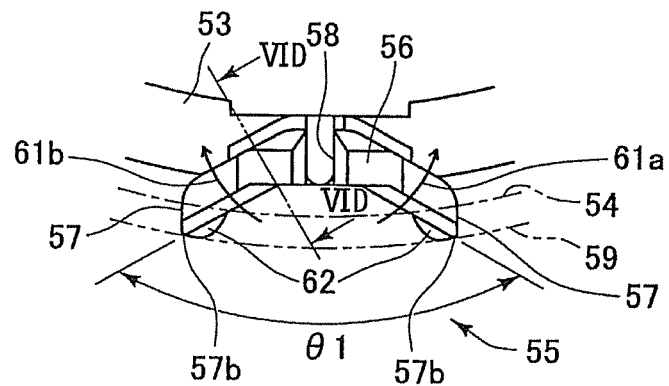
FIG. 6A is a plan view of a pawl portion of a retainer.
Figure 6B:
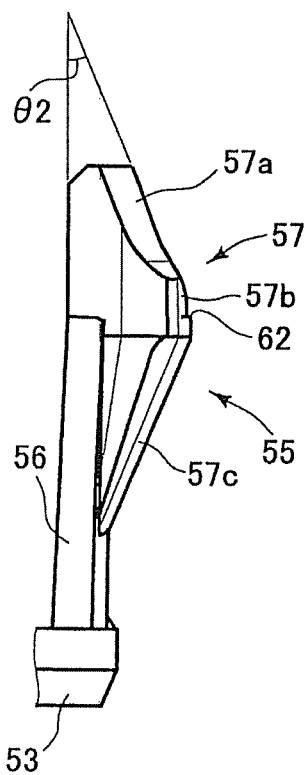
FIG. 6B is a side view of the pawl portion of the retainer.

As illustrated in FIG. 6A, a circle 59 (i.e., a virtual circle) is defined as passing through the ridge top portions 57a of the pawl members 57 while centering on the axial center of the retainer 44; the diameter of the circle 59 is larger than the hole diameter of the attachment hole 54 of each bumper 2, 4. Therefore, when the retainer 44 of the ultrasonic sensor apparatus 3 is partially inserted into the attachment hole 54 of the bumper 2, 4, the pair of pawl members 57 undergo an elastic deformation in the directions of the arrows 61a, 61b, respectively, illustrated in FIG. 6A.

Figure 6C:
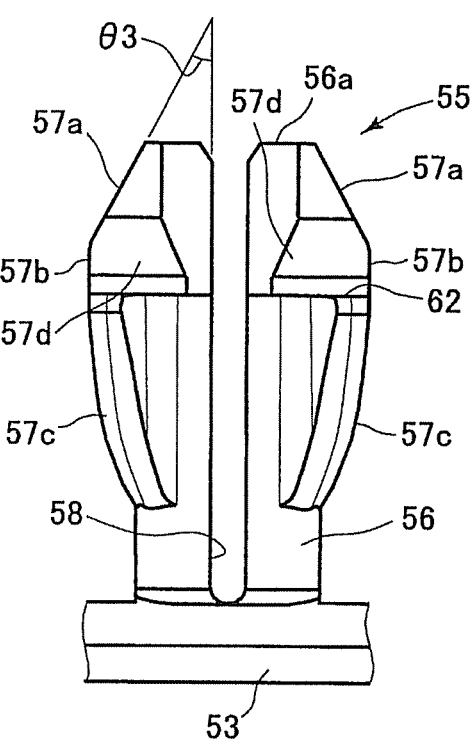
FIG. 6C is a front view of the pawl portion of the retainer.
Figure 6D:
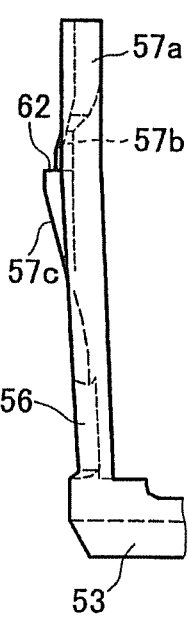
FIG. 6D is a sectional view along a line of VID-VID in FIG. 6A.

In addition, refer to FIGS. 6C, 6D. Each pawl member 57 has a stopper portion 62 that is provided on an outer side face 57d ranging from a proximity of a terminal end of the first ridge line portion 57a of the pawl member 57 to the ridge top portion 57b. When the ultrasonic sensor apparatus 3 is attached in the attachment hole 54 of the bumper 2, 4, the stopper portion 62 is caught by the exit side of the inner circumference edge 54b of the attachment hole 54 (refer to FIGS. 10B). Thus, the stopper portion 62 has a function to prevent a dropout of the ultrasonic sensor apparatus 3 from the attachment hole 54 of the bumper 2, 4. The stopper portion 62 is provided in a form to rise steeply almost right-angled from the outer side face 57d of the pawl member 57; the outermost end portion of the stopper portion 62 is connected with the second ridge line portion 57c to form a slope with a gentle angle. In the present embodiment, the maximum protrusion amount t from the outer side face 57d of the stopper portion 62 is 0.2 to 0.4 mm.

The following will explain the case body 46. With reference to FIGS. 4, 5, the case body 46 includes a sensor acceptance portion 63, a base portion 64, and a connector portion 65. The sensor acceptance portion 63 includes a hollow cylinder for accommodating the second cylinder portion 41c of the cushioning material 41. The base portion 64 supports the sensor acceptance portion 63. The connector portion 65 is attached aslant to an end portion of the base portion 64. The case body 46 has a function to support the sensor unit 42 covered by the cushioning material 41 using the sensor acceptance portion 63, and to connect the wire harness 29 using the connector portion 65. In addition, the bottom face of the base portion 64 is an opening portion that is opened outward; the board member 45 is attached into the opening portion to thereby fill the opening portion. Further, the sensor acceptance portion 63 is provided with a plurality of protruding portions 63a near an opening portion along the circumference (e.g., four protruding portions 63a in the present embodiment); each protruding portion 63a is engaged with a tab hole portion 49c of each movable wall portion 49a in the bezel 43, thereby integrating the bezel 43 and the case body 46 with each other.

Figure 7A:
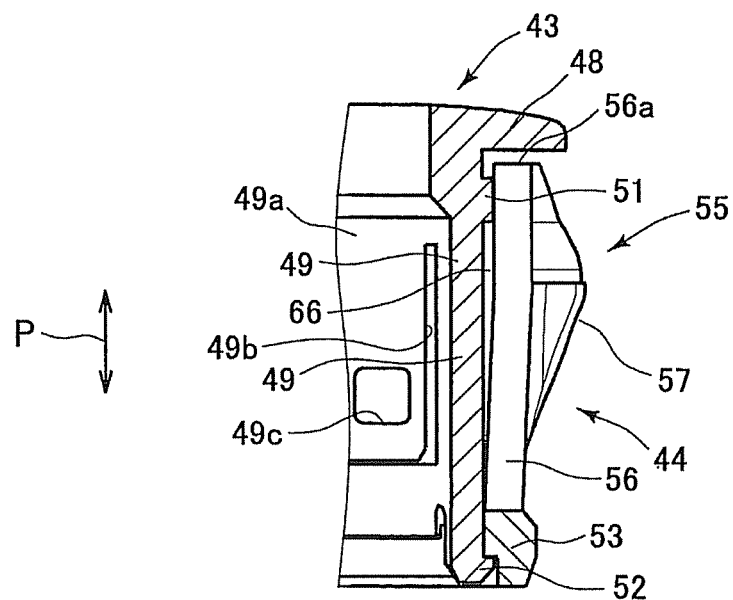
FIG. 7A is a sectional side view of a bezel having a protruding portion.
Figure 7B:
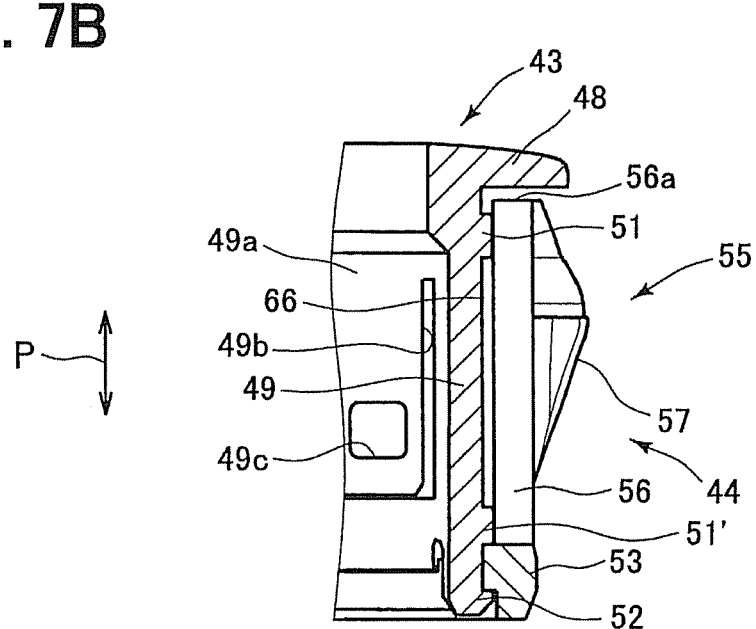
FIG. 7B is a sectional side view of a bezel having two protruding portions.

The following will explain a function of the protruding portion 51 of the bezel 43. When the retainer 44 is fitted to the bezel 43, the inner circumference face of the arm portion 56 of the retainer 44 slides on the outer circumference face of the pipe wall portion 49 of the bezel 43. At this time, each rib 50 in the outer circumference face of the pipe wall portion 49 of the bezel 43 is inserted into each slit 58 of the arm portion 56. Naturally, the width of the rib 50 is narrower than the inner width of the slit 58. Thereby, the retainer 44 does not shift along the circumferential direction. Further, as illustrated in FIG. 7A, when the arm portion 56 approaches the flange portion 48 of the bezel 43, the tip end portion 56a of the arm portion 56 runs over the protruding portion 51 in the outer circumference face of the pipe wall portion 49 of the bezel 43. In this state, the locking claw 52 of the bezel 43 is engaged with the basal portion 53 of the retainer 44. Thereby, a space gap 66 is formed in between (i) the outer circumference face of the pipe wall portion 49 of the bezel 43, and (ii) the inner circumference face of the arm portion 56 of the retainer 44.

Figure 8A:
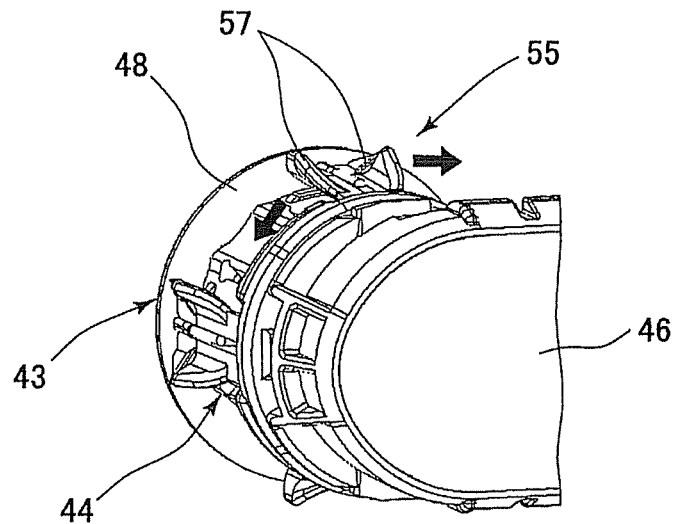
FIG. 8A is a schematic view illustrating a pair of pawl members undergoing elastic deformation.
Figure 8B:
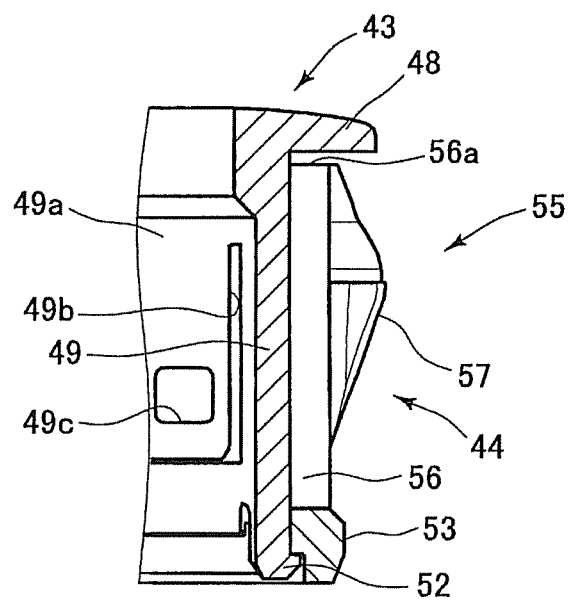
FIG. 8B is a sectional side view of a bezel having no protruding portion.

As illustrated in FIG. 8A, when the ultrasonic sensor apparatus 3 is attached to the attachment hole 54 of the bumper 2, 4 of the vehicle 1, a pair of pawl members 57 undergo elastic deformation in the directions (the directions of the arrows) to enlarge the opening angle θ1 illustrated in FIG. 6A. At this time, the elastic deformation force acts also on the arm portion 56 of the retainer 44 via the pair of pawl members 57. FIG. 8B illustrates a bezel 43 that is not provided with any protruding portion 51. In this configuration, the outer circumference face of the pipe wall portion 49 of the bezel 43 abuts firmly the inner circumference face of the arm portion 56 of the retainer 44. In this state, when a pair of pawl members 57 are elastically deformed, the force will reach the basal portion 53 of the retainer 44 via the arm portion 56. Thereby, there is a possibility that the junction of the arm portion 56 and the basal portion 53 may be damaged.

In contrast, in the ultrasonic sensor apparatus 3 of the present embodiment, a space gap 66 is provided in between (i) the outer circumference face of the pipe wall portion 49 of the bezel 43, and (ii) the inner circumference face of the arm portion 56 of the retainer 44, as illustrated in FIG. 7A. Even if the force to elastically deform the pair of pawl members 57 applies to the arm portion 56, the arm portion 56 is elastically deformed, thereby helping prevent the force from reaching the basal portion 53. This helps prevent the damage against the junction of the arm portion 56 and the basal portion 53.

In the ultrasonic sensor apparatus 3 of the present example illustrated in FIG. 7A, the protruding portion 51 is provided at a position just below the flange portion 48 in the outer circumference face of the pipe wall portion 49 of the bezel 43. Without need be limited thereto, two protruding portions 51, 51' may be provided at two positions in a height direction (i.e., in the axial direction P) with a predetermined interval, respectively. The lower side protruding portion 51' may be desirably provided to be closer to the basal portion 53 of the retainer 44 in order to increase an amount of the elastic deformation in the arm portion 56.

Figure 9A:
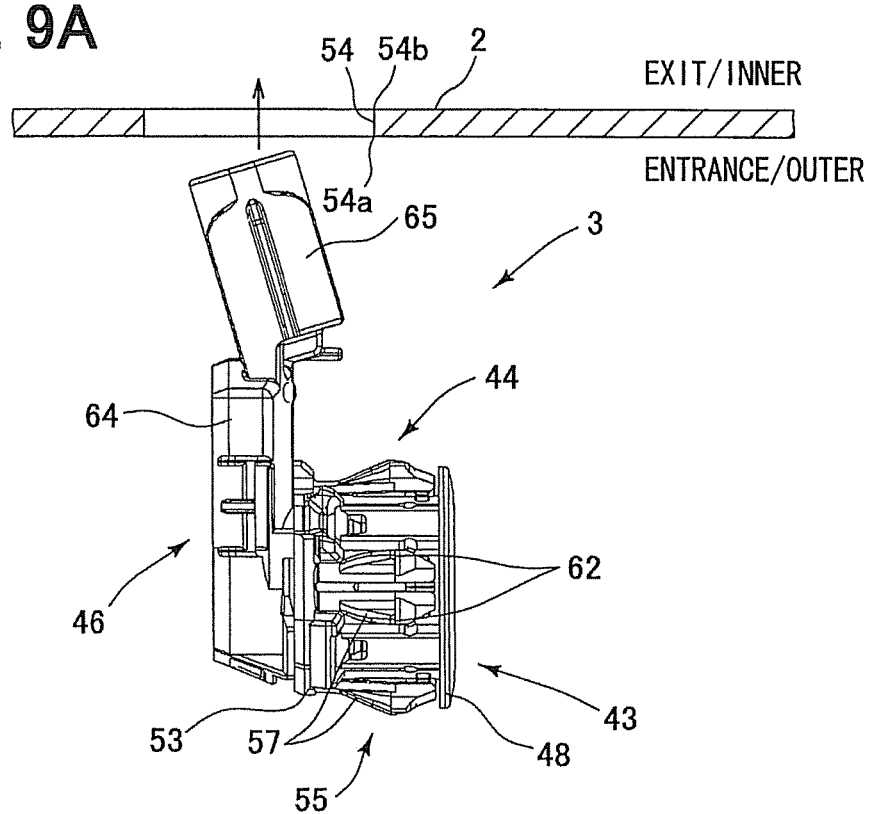
FIGS. 9A, 9B are diagrams for explaining an attachment operation to attach the ultrasonic sensor apparatus into an attachment hole of a bumper.

The following will explain an attachment operation when attaching the ultrasonic sensor apparatus 3 of the present embodiment to the attachment hole 54 of the bumper 2. Refer to FIG. 9A. The ultrasonic sensor apparatus 3 is provided to integrate the sensor unit 42, the cushioning material 41, the bezel 43, the retainer 44, and the case body 46 into one assembly unit. The ultrasonic sensor apparatus 3 is inserted such that the connector portion 65 of the case body 46 is inserted first into the attachment hole 54 of the bumper 2 (as the first order in the insertion order). In other words, the ultrasonic sensor apparatus 3 is inserted into the attachment hole 54 in the insertion order from the connector portion 65 to the other parts of the ultrasonic sensor apparatus 3.

Figure 9B:
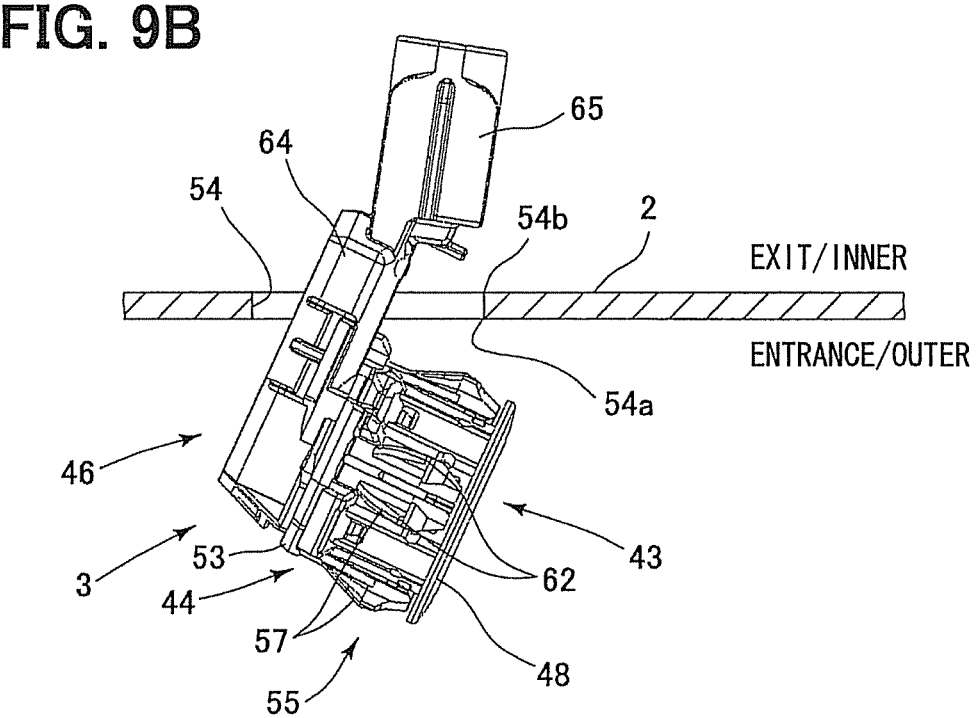

Refer to FIG. 9B. The connector portion 65 of the case body 46 has passed through the attachment hole 54 of the bumper 2, and the base portion 64 of the case body 46 is now located in the attachment hole 54. Further, while the whole of the ultrasonic sensor apparatus 3 is inclined, the base portion 64 of the case body 46 is inserted into the attachment hole 54.

Figure 10A:
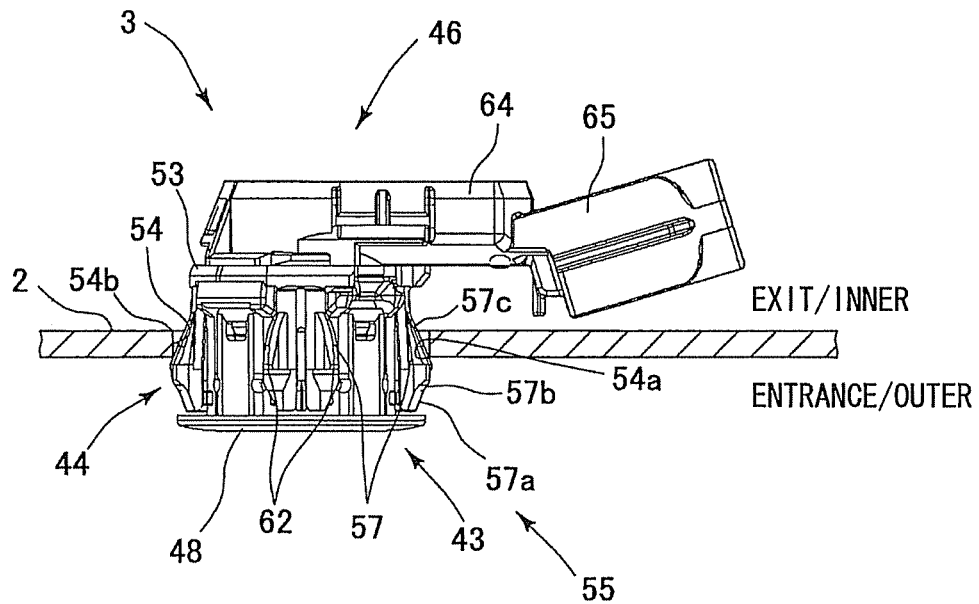
FIGS. 10A, 10B are diagrams for explaining an attachment operation to attach the ultrasonic sensor apparatus into an attachment hole of a bumper.

Refer to FIG. 10A. The base portion 64 of the case body 46 of the ultrasonic sensor apparatus 3 is placed in approximately parallel with the bumper 2, and the retainer 44 is partially inserted in the attachment hole 54. The basal portion 53 of the retainer 44 has passed through the attachment hole 54. In this state, the ultrasonic sensor apparatus 3 is pushed into the attachment hole 54 from the entrance side (i.e., an inner side of the bumper 2, 4) to the exit side (i.e., an outer side of the bumper 2, 4). The second ridge line portion 57c of each pawl member 57 of the retainer 44 abuts the inner circumference edge 54a of the entrance side of the attachment hole 54. The ultrasonic sensor apparatus 3 is furthermore pushed into the attachment hole 54 from the entrance side to the exit side. A pair of pawl members 57 are elastically deformed to turn so as to enlarge the opening angle θ1 in the directions (directions illustrated by the arrows 61a, 61b in FIG. 6A) while centering on the base end portion (junction point with the arm portion 56) of the pair of pawl portions 57. The slit 58 is provided in between the pair of pawl member 57; thus, the flexibility of the deformation of each pawl member 57 is high.

When a pair of pawl members 57 are elastically deformed and approach the outer circumference face of the pipe wall portion 49 of the bezel 43, the diameter of the circle 59 (refer to FIG. 6A) which passes through or connects the ridge top portions 57b of the pair of pawl members 57 becomes smaller than the hole diameter of the attachment hole 54 of the bumper 2. The retainer 44 (i.e., the ridge top portions 57b of the pair of pawl members 57) is enabled to pass through the attachment hole 54.

Figure 10B:
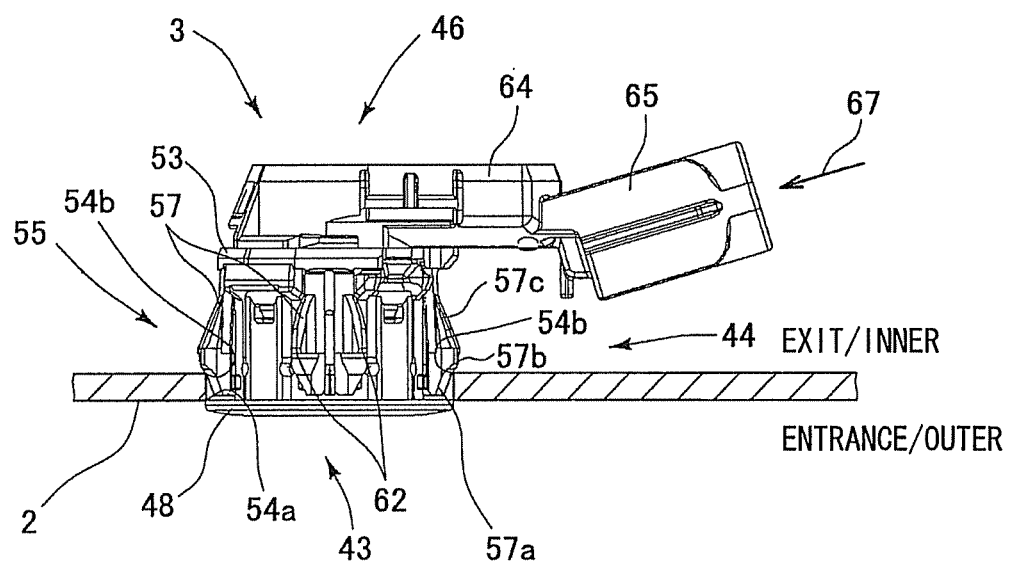
Figure 13:
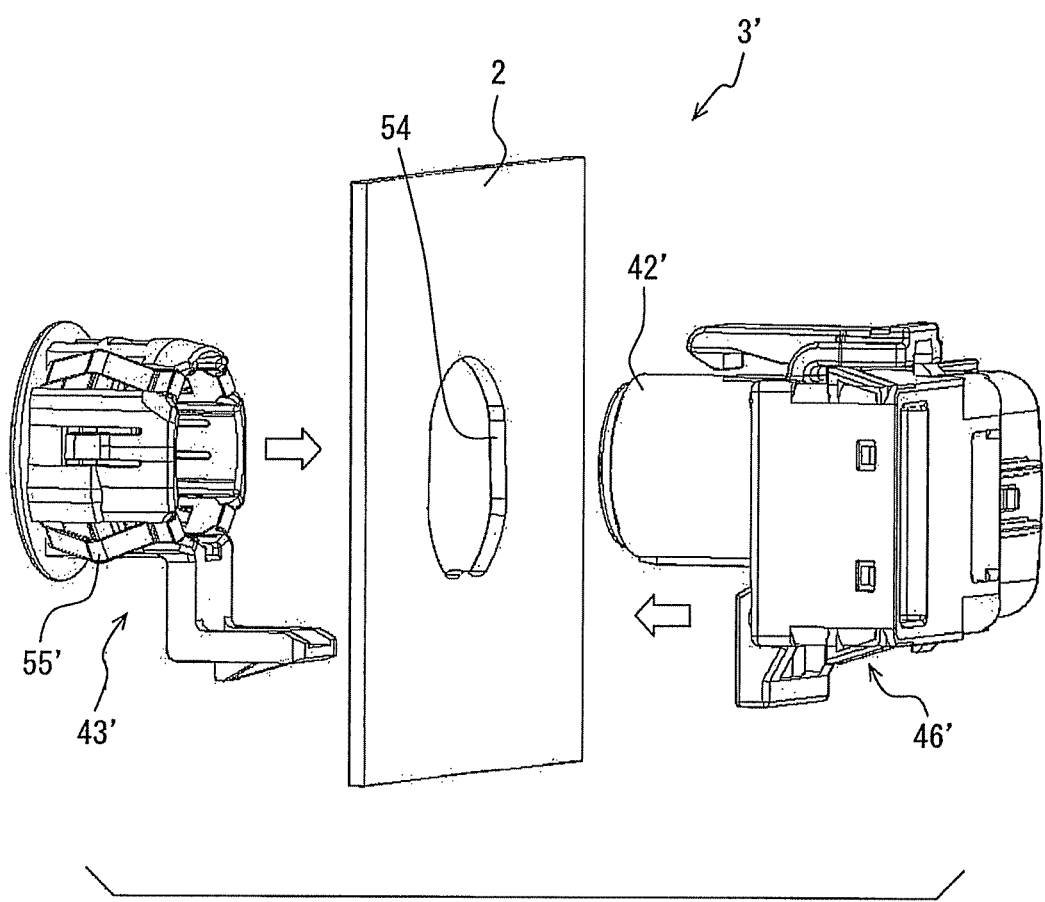
FIG. 13 is a diagram for explaining an attachment operation to attach an ultrasonic sensor apparatus into an attachment hole of a bumper in a prior art.

Refer to FIG. 10B. After passing through the attachment hole 54 of the bumper 2, the ridge top portion 57b of each of a pair of pawl members 57 passes through the inner circumference edge 54b of the exit side of the attachment hole 54. In this state, the first ridge line portion 57a of each pawl member 57 of the retainer 44 abuts the inner circumference edge 54b of the exit side of the attachment hole 54. Then, a pair of pawl members 57 are elastically restored to turn so as to reduce the opening angle θ1 in the directions (opposite to the directions illustrated by the arrows 61a, 61b in FIG. 6A) while centering on the base end portion (junction point with the arm portion 56) of the pair of pawl portions 57. When the flange portion 48 of the bezel 43 abuts the outer side (front face or entrance side of the bumper 2) of the attachment hole 54 of the bumper 2, the inner circumference edge 54b of the exit side of the attachment hole 54 abuts the first ridge line portion 57a of each of a pair of pawl members 57. As a result, the bumper 2 is sandwiched in between (i) the first ridge line portion 57a of each of a pair of pawl members 57, and (ii) the flange portion 48 of the bezel 43. At this time, a pair of pawl members 57 of the ultrasonic sensor apparatus 3 are pressed and engaged to the inner circumference edge 54b of the exit side of the attachment hole 54 by the force of the elastic restoration. The ultrasonic sensor apparatus 3 is thus prevented from escaping or dropping out from the attachment hole 54.

Further, in this state, in order to connect a connector (not shown) of the wire harness to the ultrasonic sensor apparatus 3, a force may act in the longitudinal direction of the case body 46 (direction illustrated by the arrow 67 in FIG. 10B), thereby possibly inclining the ultrasonic sensor apparatus 3. Even in such a case, the stopper portion 62 is caught by the inner circumference edge 54b of the exit side or inner side of the attachment hole 54, thereby preventing the ultrasonic sensor apparatus 3 from dropping out. Further, when the acting force is then released, the first ridge line portion 57a of the pawl portion 57 abuts the inner circumference edge 54b, thereby generating a force to pull back. The ultrasonic sensor apparatus 3 is thereby returned to the original state before the force acts.

When an operator pulls the ultrasonic sensor apparatus 3 from the outer side or entrance side of the bumper 2 in the axial direction P of the retainer 44, a force is applied to turn the pair of pawl members 57 in the directions of the arrows 61a, 61b, respectively, illustrated in FIG. 6A. The ultrasonic sensor apparatus 3 is thus enabled to be escaped from the attachment hole 54. The bumper 2, 4 is provided to have various kinds of thicknesses (for example, 1.8 mm to 3.6 mm). This distinguishes the engagement state between a pair of pawl members 57 and the inner circumference edge 54b of the attachment hole 54 depending on thickness of the bumper 2, 4.

The following will explain the cases that the thickness of the bumper 2, 4 is variable with reference to FIGS. 11A to 11C, FIGS. 12A to 12C. First, an engagement position is defined as a position of the first ridge line portion 57a of each of a pair of pawl members 57 to engage with the inner circumference edge 54b of the exit side of the attachment hole 54. Refer to FIG. 11A illustrating a case when the thickness of the bumper 2, 4 is thin (MIN). The engagement position of the first ridge line portion 57a becomes closer to the tip end portion 56a of the arm portion 56. Thus, the opening angle θ1 of a pair of pawl members 57 becomes small in the state where the ultrasonic sensor apparatus 3 is attached to the attachment hole 54 of the bumper 2, 4. In other words, a pair of pawl members 57 become approximately in a standing state. Therefore, the elastic restoration force (illustrated by the arrows in FIG. 11B, 11C) of a pair of pawl members 57 is not so great. At this time, the first ridge line portion 57a of a pair of pawl members 57 is digging into and is engaged with the inner circumference edge 54b of the attachment hole 54.

Refer to FIGS. 11B, 11C. The opening angle θ1 of a pair of pawl members 57 becomes greater as the hole diameter of the attachment hole 54 decreases. In other words, a pair of pawl members 57 become approximately in a lying state. In FIGS. 11B, 11C, FIGS. 12B, 12C, the elastic restoration force of a pair of pawl members 57 is illustrated by the arrows. The elastic restoration force when the thickness of the bumper 2, 4 is thin is not so great as compared with the case when the thickness is thick (MAX). If the opening angle θ1 is still enlarged, the outer side face 57d of the pair of pawl members 57 come to press the inner circumference edge 54b of the attachment hole 54 by the elastic restoring force responding to the enlarged opening angle θ1.

Refer to FIG. 12A that illustrates the case that the thickness of the bumper 2, 4 is thick (MAX). The engagement position of the first ridge line portion 57a of a pair of pawl members 57 becomes closer to the ridge top portion 57b of each of the pair of pawl members 57. The opening angle θ1 of a pair of pawl members 57 thus becomes great in the state where the ultrasonic sensor apparatus 3 is attached to the attachment hole 54 of the bumper 2, 4. In other words, a pair of pawl members 57 becomes in a lying state. At this time, a pair of pawl members 57 press and are engaged with the inner circumference edge 54b of the attachment hole 54 by great elastic restoration force (illustrated by the arrows in FIGS. 12B, 12C).

Refer to FIGS. 12B, 12C. The opening angle θ1 of a pair of pawl members 57 is enlarged much more as the hole diameter of the attachment hole 54 becomes smaller. The outer side face 57d of the pair of pawl members 57 come to press much more the inner circumference edge 54b of the attachment hole 54 by the elastic restoration force responding to the enlarged opening angle θ1.

Whether a pair of pawl members 55 become in a standing state or a lying state changes depending on factors such as the thickness of the bumper 2, 4 or an inclination angle of the first ridge line portion 57a of each of a pair of pawl members 55. It is noted that a reference thickness of 2.7 mm is defined as being an average of the minimum value (e.g., 1.8 mm) and the maximum value (e.g., 3.6 mm) of the bumper 2, 4. If thinner than the reference value, a pair of pawl members 55 is closer to the standing state. If thicker than the reference value, a pair of pawl members 55 can be in the lying state. The stopper portion 62 provided in a pair of pawl members 57 are caught by the inner circumference edge 54b of the exit side of the attachment hole 54 regardless of whether the thickness of the bumper 2, 4 is thin or thick.

In addition, even when the thickness of the bumper 2, 4 is constant, the hole diameter of the attachment hole 54 may be variable, for instance, between a large size (e.g., 23.6 mm) and a small size (e.g., 23.0 mm). Refer to FIGS. 11B, 11C, 12B, 12C. As the hole diameter of the attachment hole 54 is increased, the first ridge line portion 57a of a pair of pawl members 57 digs more into and is engaged with the inner circumference edge 54b of the attachment hole 54. In other words, a pair of pawl members 57 becomes closer to a standing state. This is the same tendency in the case that the thickness of the bumper 2, 4 is thin. In addition, as the hole diameter of the attachment hole 54 is decreased, the outer side face 57d of a pair of pawl members 57 presses the inner circumference edge 54b of the attachment hole 54 by the greater elastic restoration force, thereby achieving the engagement. In other words, a pair of pawl members 57 becomes in a much greatly lying state. This is the same tendency in the case that the thickness of the bumper 2, 4 is thick.

As explained above, the ultrasonic sensor apparatus 3 of the present embodiment can be inserted into the attachment hole 54 of the bumper 2, 4 from the outer side of the bumper 2, 4. Thus, the attachment of the ultrasonic sensor apparatus 3 becomes easier. For instance, the connector portion of the wire harness 29a to 29f is first taken out to the outer side of the bumper 2 via the attachment hole 54. In this state, the connector portion 65 of the ultrasonic sensor apparatus 3 is connected with the connector portion of the wire harness 29a to 29f at a position outside of the bumper 2. Then, the ultrasonic sensor apparatus 3 connected with the wire harness 29a to 29f can be inserted into and attached to the attachment hole 54 of the bumper 2.

In the ultrasonic sensor apparatus 3 of the present embodiment, the case body 46 is provided such that the sensor acceptance portion 63 and the connector portion 65 are integrated into one assembly unit. It may be provided such that the sensor acceptance portion 63 and the connector portion 65 are separately prepared and connected with each other.

In the above explanation, the bezel 43 and the connector portion 65 of the case body 46 are provided to have a predetermined inclination angle. However, they may be provided to be orthogonal to each other.

In the above, as an example of the distance sensor apparatus, an ultrasonic sensor apparatus is explained. However, it may be a sensor apparatus which measures a distance using light, electromagnetic waves, etc.

In the above, the distance sensor apparatus is attached to the bumper of the vehicle. It may be attached to any other portion other than the bumper.

The present disclosure can be used as a distance sensor apparatus of an obstacle detector mounted in a vehicle (for example, automobile).

While aspects of the disclosure described herein are already recited in the preceding summary, further optional aspects thereto may be set out as follows.

For instance, as an optional aspect of the disclosure, the pawl portion may include a pair of pawl members. The pair of pawl members may be engaged with the inner circumference edge of the exit side of the attachment hole in a state where the retainer is attached in the attachment hole of the bumper. The pair of pawl members may be arranged to be V-shaped with a predetermined opening angle in a view in the axial direction. The pair of pawl members may be elastically deformed so as to enlarge the opening angle when being inserted into the attachment hole. The stopper portion may be provided to be a protruding portion that is protruding outward from an opposing face of the pair of pawl members in the direction intersecting the axial direction of the retainer.

Manufacturing such a stopper portion does not become complicated.

For instance, as an optional aspect of the disclosure, a magnitude of a protrusion in the protruding portion of the stopper portion may be defined as being from the opposing face of the pair of pawl members. The magnitude of the protrusion may be decreased continuously as the protrusion approaches the basal portion of the retainer.

Even though the stopper portion is provided, elastic deformation and elastic restoration of the pawl portions may take place smoothly in the attachment operation where the sensor apparatus is attached into the attachment hole of the bumper. This does not make the attachment operation of the distance sensor apparatus difficult.

For instance, as an optional aspect of the disclosure, the pawl member may have a ridge line portion that is shaped to be a slope. The ridge line portion may become higher continuously outward in the direction intersecting the axial direction, from a tip end portion of the pawl member in the axial direction to the ridge top portion.

For instance, as an optional aspect of the disclosure, a board thickness of the bumper may be provided such that the stopper portion is to be caught in the inner circumference edge of the exit side of the attachment hole in an attachment state that is a state where the vehicular distance sensor apparatus is attached in the bumper. When the board thickness is thinner than a predetermined value, (i) the pawl member may be approximately in a standing state and (ii) the ridge line portion of the pawl member may be digging in the inner circumference edge of the exit side of the attachment hole to be held in a state to prevent a dropout from the attachment hole. In contrast, when the board thickness is not thinner than the predetermined value, (i) the pawl member may be approximately in a lying state and (ii) a force of elastic restoration may act on the inner circumference edge of the exit side of the attachment hole to be held in a state to prevent a dropout from the attachment hole.

For instance, as an optional aspect of the disclosure, the hole diameter of the attachment hole of the bumper may be provided such that the stopper portion is to be caught in the inner circumference edge of the exit side of the attachment hole in an attachment state that is a state where the vehicular distance sensor apparatus is attached in the bumper. When the hole diameter of the attachment hole is larger than a predetermined value, (i) the pawl member may be approximately in a standing state and (ii) the ridge line portion of the pawl member may be digging in the inner circumference edge of the exit side of the attachment hole to be held in a state to prevent a dropout from the attachment hole. In contrast, when the hole diameter of the attachment hole is not larger than the predetermined value, (i) the pawl member may be approximately in a lying state and (ii) a force of elastic restoration may act on the inner circumference edge of the exit side of the attachment hole to be held in a state to prevent a dropout from the attachment hole.

Thus, one type of the retainer of the distance sensor apparatus can respond to the variations in the board thickness of the bumper or the hole diameter of the attachment hole of the bumper.

For instance, as an optional aspect of the disclosure, a protruding portion may be provided to be protruding from the outer circumference face of the pipe portion of the bezel. The inner circumference face of the arm portion may abut against the protruding portion on the outer circumference face of the bezel, forming the space gap.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular distance sensor apparatus to be attached to an attachment hole of a bumper of a vehicle to measure a distance from the vehicle to an obstacle, the vehicular distance sensor apparatus including:
    a sensor unit that transmits a transmission signal outward from the vehicle, the transmission signal hitting the obstacle and returning as a reflection signal, the sensor unit receiving the reflection signal;
    a case body that holds the sensor unit, the case body being to be attached to the attachment hole of the bumper of the vehicle;
    a bezel that has (i) a pipe portion fitted to the case body and (ii) a flange portion at one end portion in an axial direction of the pipe portion, the flange portion having an outer diameter larger than a hole diameter of the attachment hole; and
    a retainer that is made of resin material, the retainer being fitted to the pipe portion of the bezel,
    the retainer comprising:
    a basal portion being shaped of a ring;
    a plurality of arm portions extending in an axial direction from one end face of the basal portion;
    a plurality of pawl portions that are protrusions protruding from tip ends of the plurality of arm portions in a direction intersecting the axial direction, the protrusions having ridge top portions through which a circle is defined to pass, the circle having a diameter larger than the hole diameter of the attachment hole,
    the plurality of pawl portions being elastically deformed when the plurality of pawl portions are inserted into the attachment hole,
    the plurality of pawl portions being elastically restored to be engaged with an inner circumference edge of an exit side of the attachment hole in a state where the ridge top portions have passed through the attachment hole; and
    a stopper portion configured to be caught by the inner circumference edge of the exit side of the attachment hole when the plurality of pawl portions are elastically restored in the state where the ridge top portions have passed through the attachment hole, wherein:

each of the pawl portions include a pair of pawl members, the pair of pawl members being engaged with the inner circumference edge of the exit side of the attachment hole in a state where the retainer is attached in the attachment hole of the bumper, the pair of pawl members being arranged to be V-shaped with a predetermined opening angle in a view in the axial direction, the pair of pawl members being elastically deformed so as to enlarge the opening angle when being inserted into the attachment hole; and the stopper portion is provided to be a protruding portion that is protruding outward from an opposing face of the pair of pawl members in the direction intersecting the axial direction of the retainer.

2. The vehicular distance sensor apparatus according to claim 1, wherein:

a magnitude of a protrusion in the protruding portion of the stopper portion is defined as being from the opposing face of the pair of pawl members; and the magnitude of the protrusion is decreased continuously as the protrusion approaches the basal portion of the retainer.

3. The vehicular distance sensor apparatus according to claim 1, wherein:

the pawl member has a ridge line portion that is shaped to be a slope, the ridge line portion becoming higher continuously outward in the direction intersecting the axial direction, from a tip end portion of the pawl member in the axial direction to the ridge top portion.

4. The vehicular distance sensor apparatus according to claim 3, wherein:

a board thickness of the bumper is provided such that the stopper portion is to be caught in the inner circumference edge of the exit side of the attachment hole in an attachment state that is a state where the vehicular distance sensor apparatus is attached in the bumper;

when the board thickness is thinner than a predetermined value, (i) the pawl member is approximately in a standing state and (ii) the ridge line portion of the pawl member is digging in the inner circumference edge of the exit side of the attachment hole to be held in a state to prevent a dropout from the attachment hole; and when the board thickness is not thinner than the predetermined value, (i) the pawl member is approximately in a lying state and (ii) a force of elastic restoration acts on the inner circumference edge of the exit side of the attachment hole to be held in a state to prevent a dropout from the attachment hole.

5. The vehicular distance sensor apparatus according to claim 3, wherein:

the hole diameter of the attachment hole of the bumper is provided such that the stopper portion is to be caught in the inner circumference edge of the exit side of the attachment hole in an attachment state that is a state where the vehicular distance sensor apparatus is attached in the bumper;

when the hole diameter of the attachment hole is larger than a predetermined value, (i) the pawl member is approximately in a standing state and (ii) the ridge line portion of the pawl member is digging in the inner circumference edge of the exit side of the attachment hole to be held in a state to prevent a dropout from the attachment hole; and when the hole diameter of the attachment hole is not larger than the predetermined value, (i) the pawl member is approximately in a lying state and (ii) a force of elastic restoration acts on the inner circumference edge of the exit side of the attachment hole to be held in a state to prevent a dropout from the attachment hole.

6. A vehicular distance sensor apparatus that is attached to an attachment hole of a vehicle to measure a distance from the vehicle to an obstacle, the vehicular distance sensor apparatus comprising:

a sensor unit that transmits a transmission signal outward from the vehicle, the transmission signal hitting the obstacle and returning as a reflection signal, the sensor unit receiving the reflection signal;

a case body that holds the sensor unit, the case body being to be attached to the attachment hole of the bumper of the vehicle;

a bezel that has (i) a pipe portion fitted to the case body and (ii) a flange portion at one end portion in an axial direction of the pipe portion, the flange portion having an outer diameter larger than a hole diameter of the attachment hole; and a retainer that is made of resin material, the retainer being further configured to include:

a basal portion shaped of a ring, the basal portion being fitted to the pipe portion of the basal portion;

a plurality of arm portions extending from one end face of the basal portion in the axial direction of the ring of the basal portion; and a plurality of pawl portions that are protrusions protruding from tip ends of the plurality of arm portions in a direction intersecting the axial direction, the plurality of pawl portions including ridge top portions through which a circle passes, the circle having a diameter larger than the hole diameter of the attachment hole, the plurality of pawl portions undergoing elastic deformation when being inserted into the attachment hole, the plurality of pawl portions undergoing elastic restoration after the ridge top portions pass through the attachment hole to be engaged with an inner circumference edge of an exit side of the attachment hole, wherein:

a space gap is provided to be formed in between an inner circumference face of the arm portion of the retainer and an outer circumference face of the pipe portion of the bezel in a state where the basal portion of the retainer is fitted to the pipe portion of the bezel.

7. The vehicular distance sensor apparatus according to claim 6, wherein:

a protruding portion is provided to be protruding from the outer circumference face of the pipe portion of the bezel; and the inner circumference face of the arm portion abuts against the protruding portion on the outer circumference face of the bezel, forming the space gap.

8. The vehicular distance sensor apparatus according to claim 1, wherein a space gap is provided to be formed in between an inner circumference face of the arm portion of the retainer and an outer circumference face of the pipe portion of the bezel in a state where the basal portion of the retainer is fitted to the pipe portion of the bezel.

9. A vehicular distance sensor apparatus to be attached to an attachment hole of a bumper of a vehicle to measure a distance from the vehicle to an obstacle, the vehicular distance sensor apparatus including:

a sensor unit that transmits a transmission signal outward from the vehicle, the transmission signal hitting the obstacle and returning as a reflection signal, the sensor unit receiving the reflection signal;

a case body that holds the sensor unit, the case body being to be attached to the attachment hole of the bumper of the vehicle;

a bezel that has (i) a pipe portion fitted to the case body and (ii) a flange portion at one end portion in an axial direction of the pipe portion, the flange portion having an outer diameter larger than a hole diameter of the attachment hole; and a retainer that is made of resin material, the retainer being fitted to the pipe portion of the bezel, the retainer comprising:

a basal portion being shaped of a ring;

a plurality of arm portions extending in an axial direction from one end face of the basal portion;

a plurality of pawl portions that are protrusions protruding from tip ends of the plurality of arm portions in a direction intersecting the axial direction, the protrusions having ridge top portions through which a circle is defined to pass, the circle having a diameter larger than the hole diameter of the attachment hole, the plurality of pawl portions being elastically deformed when the plurality of pawl portions are inserted into the attachment hole, the plurality of pawl portions being elastically restored to be engaged with an inner circumference edge of an exit side of the attachment hole in a state where the ridge top portions have passed through the attachment hole; and a stopper portion configured to be caught by the inner circumference edge of the exit side of the attachment hole when the plurality of pawl portions are elastically restored in the state where the ridge top portions have passed through the attachment hole, wherein a space gap is provided to be formed in between an inner circumference face of the arm portion of the retainer and an outer circumference face of the pipe portion of the bezel in a state where the basal portion of the retainer is fitted to the pipe portion of the bezel.

10. The vehicular distance sensor apparatus according to claim 9, wherein:

the pawl portion includes a pair of pawl members, the pair of pawl members being engaged with the inner circumference edge of the exit side of the attachment hole in a state where the retainer is attached in the attachment hole of the bumper, the pair of pawl members being arranged to be V-shaped with a predetermined opening angle in a view in the axial direction, the pair of pawl members being elastically deformed so as to enlarge the opening angle when being inserted into the attachment hole; and the stopper portion is provided to be a protruding portion that is protruding outward from an opposing face of the pair of pawl members in the direction intersecting the axial direction of the retainer.

11. The vehicular distance sensor apparatus according to claim 9, wherein the stop portion includes a generally flat surface that engages a first surface of the bumper immediately adjacent the attachment hole, the flange engaging a second surface of the bumper opposite to the first surface.

12. The vehicular distance sensor apparatus according to claim 11, wherein the generally flat surface is generally perpendicular to the axial direction of the retainer.

13. The vehicular distance sensor apparatus according to claim 1, wherein the stop portion includes a generally flat surface that engages a first surface of the bumper immediately adjacent the attachment hole, the flange engaging a second surface of the bumper opposite to the first surface.

14. The vehicular distance sensor apparatus according to claim 13, wherein the generally flat surface is generally perpendicular to the axial direction of the retainer.

* * * * *